INVENTORS:
Thomas U. Marron,
Fred K. White Jr. and
Helen M. Rosenberger,
BY Arms, McDougall, Williams & Hersh,
ATTORNEYS.

United States Patent Office 2,875,046
Patented Feb. 24, 1959

2,875,046

POSITIVE WORKING PHOTOLITHOGRAPHIC PLATE AND METHOD FOR MANUFACTURING SAME

Thomas U. Marron, Glenview, Fred K. White, Jr., Oak Park, and Helen M. Rosenberger, Skokie, Ill., assignors to A. B. Dick Company, Niles, Ill., a corporation of Illinois Application March 1, 1954, Serial No. 413,414

5 Claims. (Cl. 96—33)

This invention relates to the preparation of a positive working photo-offset printing plate and more particularly to the preparation of an imaged photolithographic plate by exposure directly with a positive as distinguished from the conventional indirect methods for imaging a photolithographic plate with a film negative.

In the preparation of a photolithographic plate for printing, ordinarily a film negative is made from the original by conventional photographic technique. The lithographic plate is then imaged from the negative by placing the negative over the light sensitive coating on the lithographic surface for exposure to convert the light sensitive material in the coacting to an ink receptive resinous decomposition product in the exposed portions while the light sensitive material in the unexposed portions of the plate is removed by washing to expose the original water receptive hydrophilic surface. In the indirect process described, it is necessary to make use of an additional step for preparation of the negative from the original for use in the manufacture of the ink receptive, water repellent image on the plate surface.

It is desirable, if possible, to eliminate this intermediate step for indirect imaging of the plate by the use of a negative prepared from the original and to be able to form the image on the plate surface directly from the positive and produce a positive working plate in a more efficient and economical manner, and it is an object of this invention to provide a method and materials for achieving same.

More particularly, it is an object of this invention to provide a method for producing an ink receptive image on a hydrophilic background directly from a positive thereby to eliminate the need for the production of a film negative heretofore required for photolithographic printing, which is capable of use to produce an imaged plate on various types of lithographic surfaces and it is a related object to produce elements for use in the practice of the method for imaging a positive working plate.

These and other objects and advantages of this invention will hereinafter appear and for purposes of illustration, but not of limitation, an embodiment of the invention is shown in the accompanying drawing in which—

Figure 1:
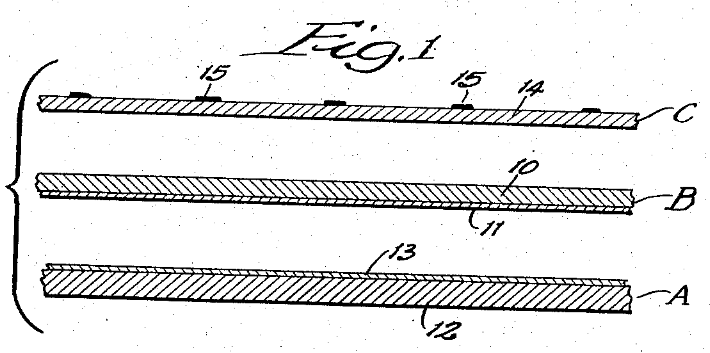
Figure 1 is a sectional elevational view of the various elements in separated relation.
Figure 2:
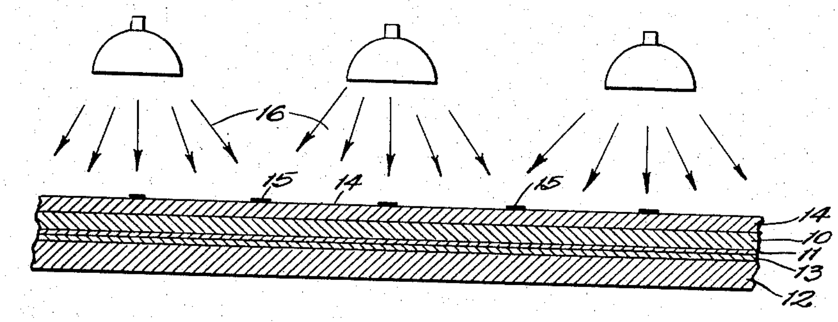
Figure 2 is a sectional elevational view of the various elements in position of use for imaging the positive working plate.
Figure 3:
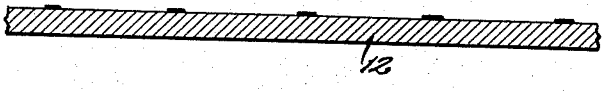
Figure 3 is a sectional elevational view of the imaged lithographic plate.

In the copending application of Marron et al., Ser. No. 323,134, filed on November 28, 1952, and entitled "Lithographic Plate and Method of Manufacturing Same," description is made of one method for producing a positive working photolithographic plate of the type described wherein a carrier having a hydrophilic, water receptive surface is formed with at least two separate coatings one of which comprises an ink receptive, hydrophobic, organo-silicon compound in the form of a polysiloxane and the other contains a light sensitive diazo compound capable of releasing hydrofluoric acid in response to light decomposition, such as a diazonium fluoborate. The hydrofluoric acid released upon decomposition of the diazonium fluoborate reacts to destroy the organo-silicon in the corresponding areas to permit the elimination thereof for exposure of the hydrophilic surface underneath or else the hydrofluoric acid decomposes the organo-silicon to form a hydrophilic substance which fortifies a base to provide the water receptive, non-imaged portion of the plate while the organo-silicon in the unexposed portions remains ink receptive and water repellent to provide the imaged portion of the plate.

In acordance with the practice of this invention, plural coatings on the aluminum or other hydrophilic water receptive base sheet is eliminated and use is made of a two sheet process for the manufacture of a positive working plate. One sheet, A, comprises the lithographic plate having a surface which is hydrophobic in character but is capable of conversion into a hydrophilic surface in response to reaction with hydrofluoric acid while the other sheet B, comprises merely a carrier 10 which is treated to provide a substantially continuous layer 11 of a diazonium fluoborate which releases hydrofluoric acid upon light decomposition.

The lithographic sheet upon which the ink receptive image is to be formed preferably comprises a metal plate 12, such as aluminum foil which has or has not been annealed, or aluminum foil the surface of which has been processed as by liquid honing, belt sanding, chemical etching, or scratch brushing, with or without lime treatment in conjunction therewith or afterwards. The hydrophobic character originally provided on the surface of the aluminum may be secured by nature of the aluminum itself on the oxide layer formed on the surfaces thereof or it may be secured preferably by means of the oleaginous material applied to the surfaces of the aluminum by way of a lubricant in processing of the aluminum into foils and sheet stock or the hydrophobic characteristics may be developed on the surface of the aluminum by the application of a coating 13 containing a hydrophobic material such as naphthol pitch, methyl methacrylate resin, nitrocellulose, cellulose ethers and esters such as cellulose acetate, cellulose acetate propionate, cellulose acetate butyrate, or ethyl cellulose, calcium and aluminum naphthenates, Thiokol, unsaturated polyester resins and copolymers thereof with styrene or vinyl, chlorinated rubber, rubber hydrochloride, polyvinyl acetate, vinyl acetate-vinyl chloride copolymer, organo-silicon fluids and resins, phenol formaldehyde resins, vinyl-2-ethyl formate, vinyl formate and the like compounds which polymerize upon drying, polyvinyl cinnamate and the like. These compounds may be applied in various amounts but it is preferred to coat the aluminum with the least amount possible, such as a monomolecular layer to develop hydrophobic characteristics thereon since the hydrophobic characteristics must be destroyed by the amount of hydrofluoric acid liberated upon exposure from the second sheet, otherwise the hydrophilic characteristics for the non-imaged portion will be incapable of being developed.

The other sheet may comprise a non-porous sheet of thin dimension, such as cellophane, glassine, or other thin film of synthetic resinous polymer or copolymer, or it may be selected of thin sheets of porous material, such as stencil base tissue, carbonizing tissue or the like, or thin webs formed of cellulose or synthetic resinous fibers and the like. When the base sheet is non-porous in character, the light sensitive diazonium fluoborate may be applied as a surface coating on one side. When a porous sheet is employed, the light sensitive material may be applied from solution by impregnation or any flow-coat or dip-squeeze process or the like. The amount of the diazonium fluoborate embodied in the contacting sheet depends upon the character of the diazonium compound and the amount of hydrophobic substance on the lithographic surface and the ability of the hydrofluoric acid released from the treated sheet to convert the hydrophobic material into a hydrophilic surface upon exposure.

Representative of the diazonium fluoborates which may be used for treatment of the carrier sheets are the fluoboric acid salts of paradiazo dimethyl aniline, paradiazo diethyl aniline, paradiazo diethoxy benzoyl aniline and other diazonium fluoborates of the type described in the application filed concurrently herewith by Marron and entitled "Photolithographic Plates and Compounds for Use in the Manufacture of Same." These salts which are exceptionally stable at room temperature, liberate hydrofluoric acid upon exposure to light in a reaction which also liberates other substances which generally remain in the carrier sheet while the hydrofluoric acid volatilizes. The fluoboric acid salts of the diazo compounds are generally applied to the carrier sheets in the form of solutions prepared in acetone or other suitable solvent, preferably in combination with a film former such as cellulose acetate, in amounts ranging from 1–15 percent by weight for coating. With film formers other than the cellulose esters or ethers, water may be used in combination with the acetone solvent in amounts for dilution up to 10 percent.

The following will illustrate the manufacture of the lithographic sheet and the sensitized sheet used in combination therewith for the manufacture of a positive working lithographic plate.

*Example 1*

A lithographic plate, which may be used as a positive working plate in the practice of this invention, may be formed of conventional aluminum sheet stock having the lubricating oil used in the processing thereof on the surface to impart the desired hydrophobic characteristics and which is worked into the surface during processing for the development of a strong bonding relation therewith.

*Example 2*

Instead of making use of the aluminum plate with the lubricating oil present on the surface thereof, use may be made of aluminum sheet stock in the form of a foil having from 0.15–10.0 mils thickness and which is subsequently coated with a vinyl chloride-vinyl acetate copolymer present in concentrations of 1–10 percent by weight in xylene and present to form at least a monomolecular coating on the aluminum surface. The vinyl chloride-vinyl acetate copolymer provides hydrophobic characteristics on a normally hydrophilic aluminum surface and is capable of use as such as a positive working plate.

*Example 3*

A contact sheet for use in plates of the type described having a hydrophobic surface may be prepared by coating glassine paper of about 30 pound weight with a solution containing 10 percent fluoboric acid salt of paradiazo diethyl aniline zinc chloride, 1 percent cellulose acetate, and 0.4 percent Calco oil blue 2A in acetone. The coating is applied in amounts to deposit about 50 grams of the fluoboric acid salt per 200–500 square feet of surface area but the amount of fluoboric acid salt of the diazo compound may vary in proportion depending upon the type of carrier, the type of fluoborate and the amount of hydrophobic substance to be decomposed on the lithographic plate.

In operation to form an imaged master directly from a positive, the aluminum foil 12 having the hydrophobic surface 13 is positioned in surface contact with the hydrophobic layer 13 adjacent the coated side 11 of the glassine carrier 10. Then the original 14 having the image 15 to be reproduced uppermost is positioned on the carrier and the assembly is exposed in the original manner to ultra-violet light 16. The light penetrates through the non-imaged portion of the original to decompose the diazonium salt in the corresponding areas of the carrier sheet in surface contact with a lithographic surface of the master. Upon decomposition, hydrofluoric acid is formed along with other products for reaction with materials providing the hydrophobic characteristics whereby such materials are converted to a hydrophilic substance or destroyed to expose the aluminum surface underneath which, in the presence of hydrofluoric acid, becomes hydrophilic in character. After exposure, upon separation of the elements, the hydrophobic character of the portion of the plate underlying the imaged portion of the original or positive will be unreacted and remain ink receptive and water repellent while the remainder of the surface which has been exposed to hydrofluoric acid for reaction will be ink repellent and water receptive. When the plate is mounted on a lithographic press, the non-imaged portion which is ink repellent and water receptive will be substantially completely wetted out by repellent while the imaged portion will receive ink and repel the aqueous material first applied to the remainder for the production of copy in the original manner. Differentiation between the ink receptive hydrophobic imaged portion and the hydrophilic background may be developed further by conventional etching and developing solutions prior to inking the plate for the production of copy.

It will be apparent from the description that a positive working offset plate of the type described develops its image in the area which is not exposed to light whereas conventional photolithographic plates of the type heretofore employed depend upon exposure to light to develop the image in the exposed areas thereby requiring an extra step for exposing the original and developing a film negative adapted to be used in the preparation of the imaged master.

It will be understood that diazonium fluoborates formed in the manner described from other diazo compounds may be used instead of the fluoboric acid salt of paradiazo diethyl aniline zinc chloride in Example 3 and that the hydrophobic surface characteristics may be provided by other materials of the type described on a suitable base sheet having an underlying hydrophilic surface but it is preferred to make use of a base sheet in the form of aluminum or other metal of the type heretofore employed. Sheeting and the formation of slots or grooves in the leading edge portion of the plates for engagement by clamping means for mounting on the plate cylinder of a lithographic machine may be effected at any time but preferably prior to sensitizing with the diazo compound.

It will be further understood that changes may be made in the details of construction, arrangement and operation without departing from the spirit of the invention, especially as defined in the following claims.

We claim:

1. For use in the preparation of a positive working lithographic plate, the combination of a master sheet having a continuous ink-repellent, water-receptive, lithographic surface and continuous coating on the surface of a water-repellent, ink-receptive hydrophobic material which is made no longer water-repellent and ink-receptive upon reaction with hydrogen fluoride, and a second sheet capable of light transmission and containing a light-sensitive diazonium fluoborate uniformly distributed continuously throughout the length and width of the sheet and which releases hydrogen fluoride as a decomposition product upon light activation, said first and second sheets being separably joined one to the other along at least one of their common edge portions with the coated side of the master sheet in face to face relation with the surface of the second sheet containing the light sensitive, hydrogen fluoride releasing material.

2. A system as claimed in claim 1 in which the second sheet is in the form of a non-absorbent base sheet and in which the diazonium fluoborate is present as a continuous coating on the surface of the second sheet and in which the coated surface is in face to face relation with the coated side of the master sheet.

3. A system as claimed in claim 1 in which the second sheet is in the form of an absorbent sheet and in which the diazonium fluoborate is present as an impregnant in uniform distribution in the sheet.

4. In the method of imaging a lithographic master directly from a positive capable of light transmission, the steps of providing a master sheet having a continuous, water-receptive, ink-repellent, hydrophilic lithographic surface and a continuous coating on the lithographic surface of an ink-receptive, water-repellent, hydrophobic material which is made no longer water repellent and ink receptive upon reaction with hydrogen fluoride, and a second contact sheet, capable of light transmission and, having in uniform distribution throughout a light-sensitive diazonium fluoborate which liberates hydrogen fluoride upon decomposition by light, positioning the second sheet in intimate surface contact with the coated lithographic surface of the master sheet, positioning the positive from which the image is to be reproduced in contact with the surface of the second sheet opposite the side contacted with the master sheet, and then directing light onto the positive whereby the light which penetrates through the non-imaged portions of the positive causes diazonium fluoborate in corresponding portions of the second sheet to decompose and liberate hydrogen fluoride as a vapor which is capable of immediate transfer to the adjacent coated surface of the master sheet to react to convert the hydrophobic substance so that it is no longer ink receptive and water repellent to form the non-imaged portions of the plate while the remainder blocked from light by the image in the positive remains unreacted to provide the hydrophobic ink-receptive and water-repellent image portion of the plate.

5. In the method of imaging a lithographic master directly from a positive capable of light transmission, the steps of providing a master sheet having a continuous, water-receptive, ink-repellent, hydrophilic lithographic surface and a continuous coating on the lithographic surface of an ink-receptive, water-repellent, hydrophobic material which is made no longer water-repellent and ink receptive upon reaction with hydrogen fluoride, and a second contact sheet capable of light transmission and, having in uniform distribution throughout a light-sensitive diazonium fluoborate which liberates hydrogen fluoride upon decomposition by light, positioning the second sheet in intimate surface contact with the coated lithographic surface of the plate, positioning the positive in surface contact with the plate and sheets, directing ultraviolet light onto the positive whereby the light passes through the non-imaged portions of the positive and reacts to cause decomposition of the diazonium fluoborate to liberate hydrogen fluoride which in turn reacts to convert the corresponding portions of the hydrophobic material in the surface coating on the master sheet so that it is no longer ink receptive and water repellent thereby to make available the underlying ink repellent, water receptive surface as the non-imaged portion of the plate while the unreacted portions remain to form the hydrophobic, ink-receptive and water-repellent imaged portion of the plate.

References Cited in the file of this patent

UNITED STATES PATENTS

| | | |
|---|---|---|
| 1,756,400 | Schmidt et al. | Apr. 29, 1930 |
| 2,542,560 | Neumann | Feb. 20, 1951 |
| 2,649,373 | Neugebauer et al. | Aug. 18, 1953 |
| 2,676,886 | Barbarite | Apr. 27, 1954 |

FOREIGN PATENTS

| | | |
|---|---|---|
| 402,737 | Great Britain | 1933 |
| 904,255 | France | Oct. 31, 1945 |